United States Patent [19]

Elsner et al.

[11] Patent Number: 5,248,639
[45] Date of Patent: Sep. 28, 1993

[54] $ZRB_2$ PHASE WITH ENHANCED ELECTRICAL AND THERMAL CONDUCTIVITIES AND SHOCK RESISTANCE

[75] Inventors: Norbert B. Elsner; John H. Norman, both of La Jolla, Calif.

[73] Assignee: Hi-Z Technology, Inc., San Diego, Calif.

[21] Appl. No.: 755,854

[22] Filed: Sep. 6, 1991

[51] Int. Cl.$^5$ .............................................. C04B 35/58
[52] U.S. Cl. ..................... 501/98; 501/102; 252/512
[58] Field of Search .................. 501/96, 102, 98; 252/512, 520

[56] References Cited

U.S. PATENT DOCUMENTS 4,929,417  5/1990  Watanabe .............................. 419/12

OTHER PUBLICATIONS

"Galvanomagnetic Effects in single Crystal $Z_rB_2$", J. Piper, *J. Phys. Chem. Solids*, vol. 27, pp. 1907–1915, 1966.
"Thermal Expansion Studies on the Groups IV–VII Transition Metal Diborides", B. Lonnberg, *J. of Less--Common Metals*, 141, pp. 145–156, 1988.
"Hall Effect & Electrical Conductivity of Transition-Metal Diborides", H. J. Juretschke & R. Steinitz, *J. Phys. Chem. Solids*, vol. 4, pp. 118–127, 1958.
"Electronic Structure & Charge Density of Zirconium Diboride", A. Switendick; The Electron Fermi Surface of $HfB_2$, T. Tanaka & Y. Ishizawa, *10th Intl. Symposium on Boron, Borides & Related Compounds*, Albuquerque, NM, 8 pages each, Aug. 1990.

*Primary Examiner*—Mark L. Bell
*Assistant Examiner*—Chris Gallo

[57] ABSTRACT

A process and related compositions for lowering the electrical resistivity of $ZrB_2$ are described. In a preferred embodiment, $ZrH_2$ or Zr powder is blended with the $ZrB_2$ powder and the composite is vacuum hot pressed at 2100° C. The elemental Zr so formed can be beneficial by gettering impurities such as oxygen, nitrogen, and carbon, and by altering the overall $ZrB_2$ stoichiometry, e.g., to $ZrB_{1.97}$. Excess Zr is present in the matrix as a finely dispersed material. A variety of dopant materials can also be used to alter the electrical, thermal, and mechanical properties. Samples exhibiting this Zr-rich second phase exhibit lower electrical resistivities, higher thermal conductivities, better thermal shock resistance.

9 Claims, No Drawings

ZRB₂ PHASE WITH ENHANCED ELECTRICAL AND THERMAL CONDUCTIVITIES AND SHOCK RESISTANCE

BACKGROUND OF THE INVENTION

The present invention relates to nominal $ZrB_2$ powders and shapes having lower electrical resistivity, higher thermal conductivity, and improved thermal shock resistance over previously reported $ZrB_2$ phase materials.

The compound $ZrB_2$ is a particularly important ceramic because it exhibits near isotropic thermal expansion, a very desirable characteristic for a ceramic used at elevated temperatures and/or used in thermal cycling operations. Remarkably, $ZrB_2$ displays these properties even though it has a hexagonal crystal structure that is made up of alternating layers of Zr and B atoms. The electrical resistivity of $ZrB_2$ is also near isotropic and the value obtained on single crystals is approximately 3 microhm-cm which is quite low and similar to those of Al metal. $ZrB_2$ appears to have the lowest electrical resistivity of any known nonmetallic compound, other than the intercalated graphites which are rather unstable above room temperature.

Although single-crystal $ZrB_2$ exhibits a low electrical resistivity, fabrication of $ZrB_2$ shapes by conventional hot pressing with known or reproducible electrical properties has proven difficult to achieve to date. Further, it has been difficult to obtain electrical resistivities on powder metallurgy-prepared material within a factor of approximately two (2) of single-crystal $ZrB_2$. Also, large variations in electrical resistivity are observed with $ZrB_2$ powders purchased from various vendors, as well as among batch-to-batch variations from individual vendors. It is not unusual to find electrical resistivity values stated in the literature that vary by factors of three or more.

Many researchers have processed $ZrB_2$ powders into various shapes, but none have attempted to lower the electrical resistivity of the samples they fabricated. For example, U.S. Pat. No. 4,929,417 describes efforts to fabricate $ZrB_2$ at lower temperatures such as by adding both elemental Zr and B to the $ZrB_2$. The elemental Zr and B are added in the appropriate ratio to form more $ZrB_2$ and reportedly react during hot pressing to produce a dense homogeneous and single-phase $ZrB_2$ body. U.S. Pat. No. 3,937,619 reports adding Ti, Zr, or Hf to $ZrB_2$ to form ternary monoborides such as $(Ti,Zr)B$ in equilibrium with the $ZrB_2$. These workers report these monoborides give a hard, tough, and strong ceramic body. Several other references, e.g., U.S. Pat. Nos. 4,419,161; 4,636,481; and 4,923,829, report formation of sintered ceramic materials using $ZrB_2$. None of these references report lowering the electrical resistivity of $ZrB_2$ to levels approaching those of single-crystal $ZrB_{2-x}$.

SUMMARY OF THE INVENTION

The present invention is for a composition having an empirical formula of $Zr_yM_{1-y}B_{2-x}$, wherein $0 < y \leq 1$, $0.03 < x \leq 1.0$, and M, when present, is an alkali, alkaline earth, transition, lanthanide or actinide metal, or carbon. The composition is also characterized by having an elemental Zr phase uniformly dispersed throughout the material.

In a preferred embodiment, the above formula of the composition has $y = 1$, in which case M is not present. When M is present, it preferably is selected from the Group IIIB, Group IVB or lanthanide metals, e.g., Sc, Y, Ti, Hf, and LaLu, including mixtures thereof. Another preferred composition has $0.05 < x < 0.20$. Most preferably, x is about 0.13.

A present composition is further characterized by having a room temperature electrical resistivity less than about 7 microhm-cm, more preferably, the electrical resistivity is about 5 microhm-cm. A present composition is also further characterized by having a thermal conductivity greater than about 0.5 watt/cm-K°, more preferably, about 1.1 watt/cm-K°. A present composition is further characterized by not fracturing when subjected to at least about 20 kilojoules of pulse energy over about 1–1000 microseconds.

Another aspect of the invention is a process for forming a Zr- and B-containing composition in which an elemental Zr phase is uniformly dispersed within a nominal $ZrB_2$ phase. Accordingly, such a process comprises the steps of:

(1) admixing a nominal $ZrB_2$ sample with $ZrH_2$ to form an admixture; and (2) maintaining the admixture at an elevated temperature for a sufficient time to decompose the $ZrH_2$ and form the Zr- and B-containing composition.

Preferably, the $ZrH_2$ is provided at a weight ratio of from 1 to 70 parts per 100 parts of the admixture. A preferred method for performing the decomposition step (2) is vacuum hotpressing. Other preferred methods for fabricating the present $ZrB_2$ materials include such conventional processes as cold press and sintering, injection molding and sintering, and slip casting and sintering.

A further preferred process comprises the step of admixing a metal hydride containing an alkali, alkaline earth, transition, lanthanide, or actinide metal, or C with the nominal $ZrB_2$ sample. Exemplary hydrides in this regard include $TiH_2$ and $YH_{2-3}$.

Also contemplated is a composition of matter formed by a process of the invention.

The present compositions and processes afford novel materials having significantly improved electrical, thermal and mechanical properties.

DETAILED DESCRIPTION OF THE INVENTION

A. Electrical Conductivity

Chemical analyses of many $ZrB_2$ powder batches by emission spectroscopy and x-ray diffraction revealed little or no variation between batches exhibiting relatively high (10 microhm-cm) and relatively low (5 microhm-cm) electrical resistivities.

Analysis of high and low electrical resistivity batches by scanning electron microscopy indicated only a microstructural difference. Only the lower electrical resistivity material exhibited a Zr-rich phase of elemental Zr finely distributed in the matrix.

From this analytical work, the idea for generally lowering the electrical resistivity of $ZrB_2$ was conceived. A sample of $ZrB_2$ powder was blended with 5 wt % $ZrH_2$, and the composite was subsequently vacuum hot pressed in a graphite die with graphite plungers at 2100° C. for 2 hours. This sample exhibited a resistivity of approximately 5 microhm-cm or approximately half the electrical resistivity of samples pressed with no $ZrH_2$ additions; subsequent samples have measured as low as between 4 and 5 microhm-cm. The Zr is added most frequently as $ZrH_2$ because elemental Zr powder readily oxidizes, contributing to the system's oxygen complement. $ZrH_2$ is fairly stable at room temperature, allowing the powder to be handled in air during sample preparation. $ZrH_2$ dissociates below 1,000° C. into Zr and $H_2$ and the $H_2$ is readily pumped out of the hot pressing die during the heat-up cycle.

The role of the elemental Zr addition to $ZrB_2$ is thought to influence the $ZrB_2$ by gettering certain components in the $ZrB_2$ powder (e.g., oxygen), and by causing the $ZrB_2$ structure to become boron-deficient. Both of these mechanisms are discussed in more detail below:

1) The elemental Zr that dissociates from the $ZrH_2$ is molten during hot pressing at 2100° C. and can readily dissolve, according to distribution coefficients, a certain amount of known contaminants such as $O_2$, $N_2$, and C, as well as tie them up by forming, for example, $ZrO_2$, ZrN, and ZrC. The $O_2$ level is known to be rather high in commercial $ZrB_2$ powders, typically 0.5 wt %, or 5,000 ppm. Suppliers of $ZrB_2$ derive it from $ZrO_2$ by the boro-carbothermic process, thus it is very difficult to remove the last remnants of O in particular dissolved $O_2$.

In the boro-carbothermic process, various amounts of $ZrO_2$, $B_4C$, and C are reacted to form $ZrB_2$ and $CO_2$, and the process is carried out at approximately 1800° C. or higher in an inert or vacuum atmosphere. The distribution coefficients of O, C, and N in Zr vs $ZrB_2$ are expected to be highly favorable.

The finely ground $ZrB_2$ powder acquires a protective oxide film during grinding and subsequent storage. Removal of the oxygen from these films on the particles is difficult to achieve since both Zr and B are strong oxide formers. The molten Zr can dissolve and/or break down this $ZrO_2$ film that resides at the grain boundaries. The Zr can also dissolve some of the $O_2$ that might be dissolved within the $ZrB_2$ powder particles.

Since $ZrO_2$ is an electrical insulator, removal of the $ZrO_2$ films that encapsulate the powder particles can be expected to reduce the electrical resistivity of the hot pressed samples. The Zr-containing liquid formed at the hot pressing temperatures is also beneficial in promoting densification of the sample.

2) Elemental Zr can diffuse into, and boron can diffuse out of, $ZrB_2$ powder and cause the stoichiometry of the powders to change from $ZrB_2$ to $ZrB_{2-x}$, where "X" represents the amount of boron deficiency in the $ZrB_2$ lattice. As more boron vacancies are created, the electrical resistivity would be expected to decrease since less Zr electrons would be tied up in bonding to the boron atoms. Some of these unbound Zr electrons are then available as electrical carriers to decrease the resistivity. Perhaps electron mobility is unaffected by this process. Alternatively, the increased boron deficiency might also allow the available electrons to exhibit a larger mobility. The product of the number of electron carriers times their electron mobility determines the electrical resistivity of a material.

It should be kept in mind that $ZrB_2$ is a very unusual electrical conductor that exhibits a conducting population of only approximately 0.04 electrons per unit cell, which is an unexpectedly low value. However, the mobility of these electrons is clearly very high; the electrons with a high mobility can travel long distances before they encounter a scattering center. In contrast, for Al, a metal having the same approximate electrical resistivity as single-crystal $ZrB_2$, the transporting electron count per unit cell is approximately 12 but the electron mobility is relatively low. Since the number of boron vacancies in the $ZrB_2$ compound may strongly influence the number of electrons available for conduction, as well as their mobility, it may be necessary to control the $ZrB_2$ stoichiometry. In support of this boron deficiency model is the experimental data generated by two investigators who obtained electrical resistivities of approximately 3 microohm-cm on single crystals of $ZrB_2$. Both investigators reported the stoichiometries of their single crystals to be approximately $ZrB_{1.97}$ [Piper, J., *J. Phys. Chem. Solids*, 27 (1966); Tanaka, T. et al. *Tenth International Symposium on Boron, Borides and Related Compounds*, Albuquerque, N. Mex. August 1990].

B. Thermal Conductivity

Lowering the electrical resistivity has also resulted in increased thermal conductivity. This increase in thermal conductivity was anticipated since thermal conduction in highly electrically conducting materials is governed by phonon and electron energy transport, with electron transport very important. In comparative thermal conductivity measurements on $ZrB_2$ samples, a lower electrical resistivity sample similar to the sample discussed above exhibited a thermal conductivity 30% higher than the higher electrical resistivity sample.

C. Thermal Shock Resistance

The $ZrB_2$ phase diagram is unique since there are no reported compounds between Zr and $ZrB_2$. Thus, metallic Zr and $ZrB_{2-x}$ can exist in equilibrium with each other. A review of recent phase diagrams indicates this situation is not present in either the Ti-B or Hf-B systems. Ti, Zr, and Hf normally exhibit similar alloying behavior since all three Group IVA elements tend to act similarly in their chemical activity with other elements. However, the mechanical properties of these metals can be expected to differ.

The significance of finely distributed Zr, which appears as droplets in the $ZrB_2$ matrix, appears to be an asset with respect to the mechanical properties of the composite. While $ZrB_2$ is a non-ductile ceramic, Zr is metallic and can absorb strain. Several $ZrB_2$ components fabricated with the excess Zr finely distributed in the matrix have survived repeated thermal cycling during high-voltage and high-current pulse power evaluation tests. During these severe tests the $ZrB_2$, which has a melting point greater than 3,000° C., was melted only at the surface by a 20 kilojoule pulse of energy and did not crack. This study demonstrates the fracture resistance of the material when subjected to thermal shock.

D. Dopants

Small additions of a low volatility metallic dopant to the $ZrB_2$ material also can afford beneficial properties. For example, hotpressing approximately 5 wt % of Ti as $TiH_2$ [Cerac; Milwaukee, Wis.] with $ZrB_2$ gives a mixed product under the conditions described herein. In small amounts, intermediate compounds such as TiB are not expected to form in the presence of low concentrations of Ti, or a Ti-Zr remnant second phase alloy.

Other metals expected to act similarly include Group VB metals such as V, Nb, and Ta, Group IIIB metals such as Sc and Y, the lanthanide metals such as La, Ce, Er, and Yb, the actinides such as U, Group IIA metals Be, Ca, Sr, and Ba, Group IA metals such as Li and Na, and C. It is also contemplated that mixtures of these components can be employed, e.g., mischmetal. These dopants can act as electron donors, e.g., n-type dopants, to $ZrB_2$ by substituting for Zr or B, or by causing the stoichiometry to shift so that more B vacancies are created. These vacancies can cause more electron carriers to be generated and/or increase the electron mobility. For example, about 0.3 wt % $YH_{2\text{-}3}$ [Cerac], 3.0 wt % $ZrH_2$, and $ZrB_2$ were admixed and hot pressed under the conditions described herein. The product formed had a room temperature resistivity of approximately 4 microohm-cm.

E. Summary

In summary, the roles played by an excess metal, e.g., Zr, in forming the present composites are to:
(a) beneficially redistribute impurites from the grains and grain boundaries, particularly $O_2$;
(b) shift the $ZrB_2$ phase composition to a $Zr$—$ZrB_{2-x}$ phase boundary, in which $2-x \leq 1.97$; and
(c) finely disperse Zr in the matrix.

F. Examples

A batch of $ZrB_2$ powder [Advanced Refractory Technologies; Buffalo, N.Y.] when vacuum hotpressed, exhibited an electrical resistivity of approximately 10 microohm-cm. A 20-gram portion of this powder was blended with 5 wt % $ZrH_2$ powder [Cerac] and the blended mixture was vacuum hot pressed at 2100° C. for 2 hours at 7500 psi. This sample exhibited a resistivity of approximately 4-5 microhm-cm, or approximately half the electrical resistivity of samples vacuum hot pressed in a similar manner with no $ZrH_2$ additions.

This electrical resistivity value is also much lower than any reported value in the literature for material prepared by powder metallurgy. The thermal conductivity of a sample of a similar composition was approximately 1.1 Watts/cm-K, which is approximately 2 to 4 times higher than previously reported. Additional $ZrB_2$ samples containing 8 wt % and 10 wt % $ZrH_2$, respectively, were processed with similar reductions in electrical resistivity. A sample with 20 wt % $ZrH_2$ apparently contains more than optimal second-phase Zr, as this sample exhibited an electrical resistivity of 8 microhm-cm. Since elemental Zr has an electrical resistivity of 42 microhm-cm, it is logical to expect (from the rule of mixtures) the second-phase Zr, at some composition and finely dispersed in the microstructure, to progressively increase the sample electrical resistivity as the Zr content is increased.

G. Applications

The present $ZrB_{2-x}$ compositions should find many applications, not only because they have a low electrical resistivity but because they also have a relatively low density of 6.08 g/cc, are very hard and heat-resistant, are oxidation- resistant at elevated temperatures, and can withstand thermal cycling. Some of these areas of application include:

High temperature conductors, such as electrodes for Al refining, which operate at approximately 1,000° C. molten Al (in an oxidizing atmosphere);
Spot welding electrodes for joining metal foils, etc.;
Thermal bonding electrodes for the electronics industry;
Electrode materials for various pulse power applications such as rail guns and for devices that break down the pollutants $NO_x$ and $SO_x$;
Electrodes for arc-jet engines and plasma spray guns;
As a powder, $ZrB_2$ can be used as a filler in epoxies and other organic compounds to enhance their electrical and thermal properties;
High temperature conductors for space applications where the low electrical resistivity and low density of $ZrB_2$ make it more advantageous than Mo or W.

Although the present invention has been described in some detail by way of illustration and example for purposes of clarity and understanding, certain obvious modifications can be practiced within the scope of the appended claims.

What is claimed is:

1. A composition having an empirical formula $Zr_y M_{1-y} B_{2-x}$, wherein $0 < y \leq 1$, $0.03 < x \leq 1.0$, and M when present is selected from the group consisting of alkali, alkaline earth, transition, lanthanide, and actinide metals, and carbon, the composition having an elemental Zr phase uniformly dispersed within the composition.

2. The composition of claim 1, wherein y is 1.

3. The composition of claim 1, wherein $0.05 < x < 0.20$.

4. The composition of claim 1, wherein M is selected from the group consisting of Ti, Hf, Sc, Y, and the lanthanides.

5. A composition having an empirical formula of $Zr_y M_{1-y} B_{2-x}$, wherein $0 < y \leq 1$, $0.03 < x \leq 1.0$, and M when present is selected from the group consisting of alkali, alkaline earth, transition, lanthanide, and actinide metals, and carbon, wherein the composition has a room temperature electrical resistivity less than about 7 microohm-cm and an elemental Zr phase uniformly dispersed within the composition.

6. The composition of claim 5 further characterized by having a thermal conductivity greater than about 0.5 watt/cm-K°.

7. The composition of claim 5 further characterized by having greater resistance to thermal shock than $ZrB_2$.

8. A method for increasing the electrical conductivity of a zirconium diboride sample comprising:
admixing the zirconium diboride sample with Zr or $ZrH_2$ to form an admixture thereof; and
sintering the admixture to form a Zr- and B-containing material more electrically conductive than the zirconium diboride sample wherein the sintered admixture contains a elemental Zr phase uniformly dispersed within the admixture.

9. The method of claim 8 wherein said admixing includes admixing the zirconium diboride sample with a metal or hydride of a metal selected from the group consisting of Sc, Y, Ti, Hf, and lanthanides.

* * * * *